United States Patent [19]

Boyd et al.

[11] 4,179,638

[45] Dec. 18, 1979

[54] CATHODE RAY TUBE PANEL

[75] Inventors: David C. Boyd, Corning; Henry E. Hagy, Painted Post; David A. Thompson, Horseheads, all of N.Y.

[73] Assignee: Corning Glass Works, Corning, N.Y.

[21] Appl. No.: 920,150

[22] Filed: Jun. 29, 1978

[51] Int. Cl.[2] .......................... H01J 29/86; C03C 3/04

[52] U.S. Cl. ....................................... 313/480; 106/53

[58] Field of Search ........................................ 313/480; 106/53 (U.S. only)

[56] References Cited

U.S. PATENT DOCUMENTS

| | | | |
|---|---|---|---|
| 3,987,330 | 10/1976 | Shell | 313/480 |
| 4,065,696 | 12/1977 | Steierman | 313/480 |
| 4,065,697 | 12/1977 | Steierman | 313/480 |

FOREIGN PATENT DOCUMENTS

| | | | |
|---|---|---|---|
| 50-87405 | 7/1975 | Japan | 313/480 |

*Primary Examiner*—Palmer C. Demeo

*Attorney, Agent, or Firm*—Clinton S. Janes, Jr.; Milton M. Peterson

[57] ABSTRACT

There is disclosed an improved glass panel for a cathode ray tube adapted to use in color television reception. The panel glass undergoes a minimum amount of compaction on reheating, has a strain point greater than 470° C., a liquidus below 900° C., and a composition selected from a family within the $SiO_2$-$Al_2O_3$-MgO-CaO-SrO-BaO-PbO-$Na_2O$-$K_2O$ field. Special additives in minor amounts include $TiO_2$, $CeO_2$, $Sb_2O_3$, $As_2O_3$, F, and oxide colorants.

3 Claims, 1 Drawing Figure

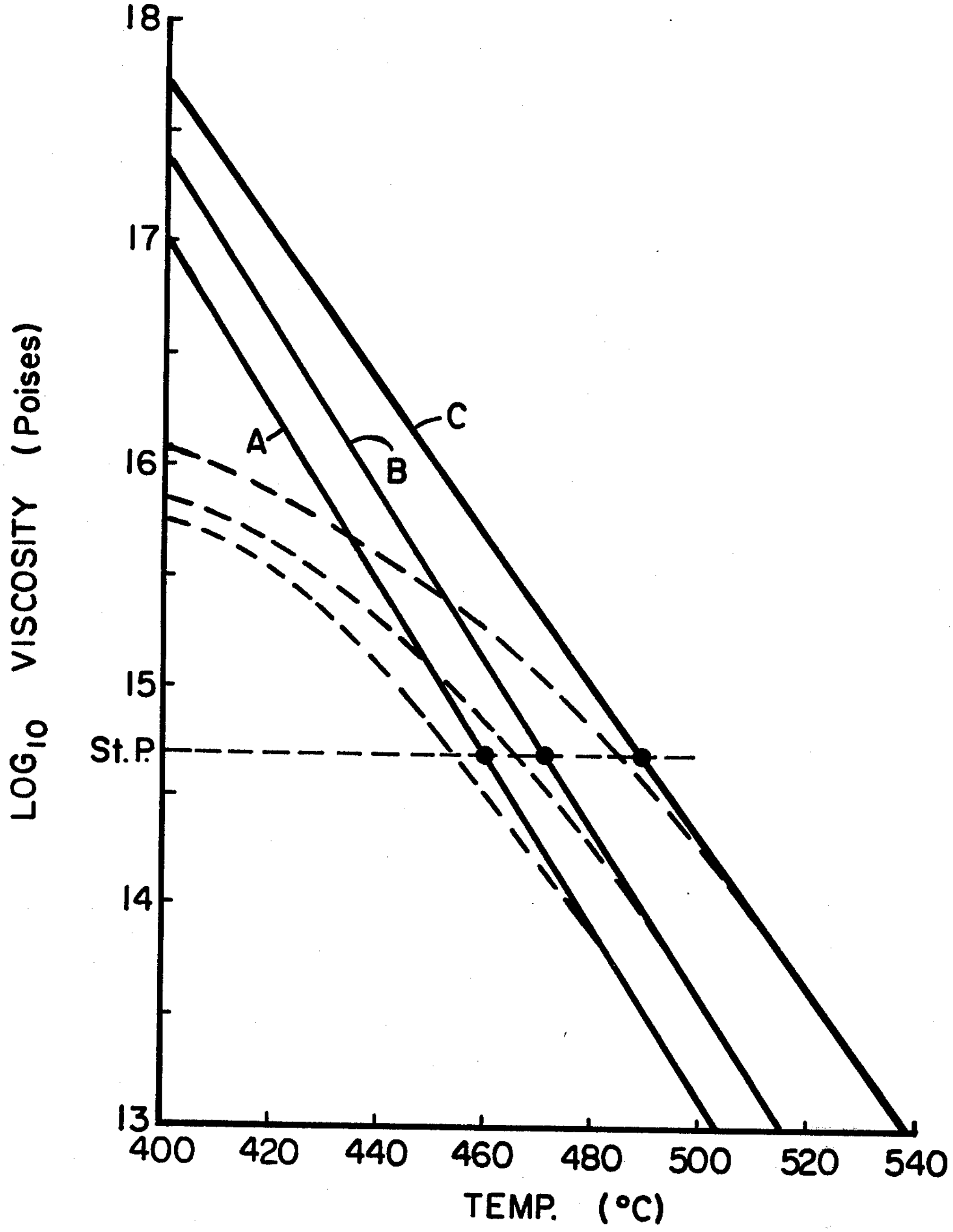
18
17
16
15
St.P.
14
13
LOG10 VISCOSITY (Poises)
A
B
C
400
420
440
460
480
500
520
540
TEMP. (°C)

CATHODE RAY TUBE PANEL

BACKGROUND OF THE INVENTION

This invention is concerned with a picture display panel for a cathode ray tube employed in a color television receiver, and with an improved glass from which such panel is produced.

A conventional cathode ray tube for color television reception consists basically of a glass display panel, a pattern of phosphor configurations forming a screen on the interior of the panel, a tubular neck portion in which an electron gun is mounted in fixed position, an intermediate funnel portion spacing the gun from the panel, and an electron mask. During tube operation, the mask, which is provided with a pattern of perforations, intercepts in part the electron gun output and transmits the remainder as electron beams. These beams impinge on the phosphor configurations to produce the color picture.

The phosphor configurations, commonly in groups of three, may take various forms, but are usually referred to as dots. It is, of course, critical that the electron passages in the mask, and the resultant electron beams, be carefully aligned with the phosphor dots, and that such alignment is maintained as closely as possible throughout the assembly and processing of the tube.

It was recognized, at least as early as 1964, that alignment of the electron passages in the mask with the phosphor dots could be lost during thermal processing operations, such as frit sealing of the tube components and bake-out of the phosphor screen. The nature and effect of the problem are described in some detail in U.S. Pat. No. 3,357,767, granted Dec. 12, 1967 to P. C. Shaffer.

It has been found that this source of misalignment arises in part at least from a change in glass structure during the thermal treatment, the phenomenon being known as compaction and resulting in a change in glass density. Thus, the ordinary glass annealing process, while adequate to reduce observable strains in the glass, does not actually produce a glass body that is structurally stable. Accordingly, the Shaffer patent proposed to solve the problem by subjecting the glass panel to a preliminary heat treatment equal in degree and in time to the heat treatment that the glass would ultimately be exposed to during tube manufacture.

The problem of glass compaction, and resultant loss of alignment during thermal processing, can also be remedied by prolonging or extending the normal glass annealing schedule to approach the fine anneal that is commonly used in obtaining refractive index control in optical glasses. While such extended and/or separate steps are obviously cumbersome and expensive, they nevertheless are resorted to in color television tube production.

PURPOSE OF THE INVENTION

It would, of course, be highly desirable to provide glass panels wherein the potential for structural instability known as compaction is minimized. It would be particularly desirable to sufficiently minimize this instability potential so that a cathode ray tube panel having an ordinary commercial anneal could be successfully used in tube production without further or extended heat treatment. It is the primary purpose of this invention to provide such improved panels and glass compositions for their production.

At the same time, it is a purpose of the invention to provide such improved glass panels without substantial sacrifice of properties deemed essential in color television tubes. Such properties include an electrical resistivity greater than $10^7$ ($Log_{10}R > 7$), when measured at 350° C., to avoid electrical leakage from a tube to the receiver chassis; also adequate absorbing power to prevent X-ray transmission through the panel in dangerous amounts during tube operation; further, inhibition of glass discoloration due to impingement of electrons thereon; and suitable thermal expansion characteristics to permit sealing of panel and funnel parts through the medium of a frit sealing glass.

A further purpose is to provide a glass in which danger of devitrification is minimized during forming and working of the glass. To this end, a glass having a liquidus temperature below 900° C. is considered highly desirable.

SUMMARY OF THE INVENTION

The invention resides in a glass panel for a cathode ray tube to be employed in a color television receiver, the panel having a low degree of compaction after normal annealing, a strain point over 470° C., a liquidus temperature below 900° C., and the glass composition, as calculated from the batch, being chemically composed essentially of, in addition to silica, 1-3% $Al_2O_3$, 1.5-3% MgO, 2.5-4.5% CaO, 5-10% SrO, 3-10% BaO, 1-2.5% PbO, 6-10% $Na_2O$, 4-8% $K_2O$, the total content of SrO+BaO+CaO+MgO being 15-24%. Preferably, the ratio of $Na_2O$ to $K_2O$ is at least 1:1, and the ratio of BaO to SrO is also at least 1:1. Up to 0.4% fluorine may be present. Additive oxides normally present in a panel glass for a color television tube include up to 1% each of $CeO_2$, $TiO_2$, $As_2O_3$, $Sb_2O_3$, and known glass colorant oxides.

RELATED ART

U.S. Pat. No. 2,527,693, granted Oct. 31, 1950 to W. H. Armistead, discloses electrical glasses having a long working range, composed of alkali metal aluminosilicates containing fluorine and, optionally, containing barium oxide as well as other divalent metal oxides.

U.S. Pat. No. 3,422,298, granted Jan. 14, 1969 to J. de Gier, discloses a cathode ray tube having a two-ply panel, the outer pane or ply containing lead oxide to absorb X-rays generated within the tube, and also cerium oxide in an amount sufficient to avoid glass discoloration due to impingement of X-rays thereon.

U.S. Pat. No. 2,388,866, granted Nov. 13, 1945 to J. H. Partridge, discloses a potash-lead glass for electric lamps wherein a part of the lead and potassium oxides is replaced by strontium oxide (SrO), while maintaining good electrical resistivity and easy melting characteristics in the glass.

U.S. Pat. No. 3,464,932, granted Sept. 2, 1969 to J. H. Connelly et al., discloses the efficacy of strontium oxide as an X-ray absorber, relative to barium oxide, within a certain wavelength range.

U.S. Pat. Nos. 3,794,502 and 3,627,549, both granted to C. M. LaGrouw, disclose cathode ray tube panels formed from alkali metal, barium aluminosilicate glasses that, optionally, contain CaO, MgO, and PbO.

U. S. Pat. No. 3,723,354, granted Mar. 27, 1973 to M. Wada et al., discloses alkali metal aluminosilicate glasses containing oxides of barium, tungsten, zinc, and lead as X-ray absorbers, and additionally containing small amounts of oxides of magnesium and calcium.

U.S. Pat. No. 3,805,107, granted Apr. 16, 1974 to D. C. Boyd, discloses cathode ray tube panels of alkali metal aluminosilicate glasses that contain oxides of strontium and lithium, and are free of fluorine. The glasses also contain lime and magnesia.

U.S. Pat. No. 3,987,330, granted Oct. 19, 1976 to J. A. Shell, discloses glass compositions containing oxides of zirconium, lead, barium, and strontium to achieve X-ray absorption, resistance to devitrification, and other glass forming properties which render them particularly suited for color television cathode ray tube faceplates.

THE DRAWING

The single FIGURE in the drawing is a graphical illustration of the relationship between temperature and viscosity in glasses.

GENERAL DESCRIPTION

Referring to the drawing, temperature (T) is plotted along the horizontal axis in degrees Centigrade (°C.), and the logarithm to the base 10 of glass viscosity ($Log._{10}$ Vis.), as measured in poises, is plotted along the vertical axis. Inasmuch as the graph is presented primarily to illustrate the problem, rather than the solution, absolute values are not particularly significant. However, the curves shown are based on actual data obtained from measurements on three glasses as later identified.

Each of the straight lines illustrates the manner in which the viscosity of a glass theoretically increases as that glass is cooled very slowly through the indicated temperature range. In a normal commercial anneal, however, the cooling rate is such that the glass viscosity is suppressed due to insufficient time for structural organization. This suppressed viscosity is retained during initial reheating of a glass, but may be released at higher temperatures. The dotted curve, corresponding to each straight line and intersecting therewith, illustrates the viscosity values actually observed for each glass during a commercial annealing process.

It is apparent that, while the normal commercial anneal adequately reduces strain in a glass, it does not permit a complete change of the molecular arrangement or structure that can occur as the glass cools. This leaves, essentially frozen in the glass, a condition of residual change or structural instability that may be released upon reheating. In other words, there is, in a commercially-annealed glass panel, a residual change in molecular arrangement or structure that can occur, in part at least, if the glass is reheated to a sufficiently high temperature, particularly to a temperature within the range of 400°-500° C.

It is our belief that such changes do occur, for example, during the frit sealing and/or screen bakeout operations in tube assembly, and that they are the cause of the problems disclosed in the previously-mentioned Shaffer patent. Thus, we believe that, as the glass further densifies by structural change, the position of the phosphors on the glass surface changes and misalignment occurs. Such changes in the glass are commonly referred to as compaction, and that term is used hereafter.

It will be observed in the drawing that the differential between points on the dotted lines (actual values) and corresponding points on the solid lines (equilibrium values) rapidly increases as the temperature values decrease. This indicates an increased potential energy for change to an equilibrium value as the temperature becomes lower. However, while a very large potential for change exists at lower temperatures, the rate at which this change occurs also may be very slow. This suggested that the amount of change in the fixed time interval of any normal heat treating operation could be minimized if the temperature of that operation were low relative to the glass strain point.

Based on this line of reasoning, it was theorized that the compaction problem might be solved, or at least greatly minimized, if the strain point of a glass were raised to a sufficiently high temperature value. Thus, if the temperature of subsequent heat treatment, which would remain constant, were sufficiently far below the strain point of a glass, then the rate of structural rearrangement in the glass during such heat treatment might be so slow as to cause very little compaction to occur during the heat treatment.

Attempts to apply this theory to the compaction problem resulted in rather erratic results. It now appears that the theory has a degree of validity, but that such degree varies greatly with the type of glass involved, that is, with the actual chemical components of the glass. By way of specific illustration, it has been found, quite contrary to what might be expected, that the amount of compaction that occurs in a commercially-annealed glass corresponding to the glass of curve B of the drawing may be appreciably less than that occurring in the glass of curve C, when such glasses are heat treated for periods of time up to one hour at 415° C. or at 450° C. On the other hand, the degree of compaction occurring in either of these glasses is substantially lower than that occurring in the glass of curve A when that glass is subjected to similar treatment.

The glasses of the present invention then are characterized by a relatively low degree of compaction during subsequent heat treatment. Further, their elevated strain points minimize visco-elastic deformation during such subsequent heat treatment. Such deformation is manifested by a change in the actual contour or geometry of a panel. It may be a gravity-induced change, as during frit sealing or screen bakeout, or it may occur due to the external forces generated during tube evacuation. In any evant, such visco-elastic deformation is another major contributor to dot misalignment.

A further point of particular interest is the liquidus temperature of a glass. This is the temperature at which crystallization occurs in the glass as the glass is cooled and then held at that temperature. In addition to minimizing the forces of compaction and visco-elastic deformation that cause dot misalignment, then, the present glasses have liquidus temperatures below 900° C.

Finally, the present glasses are essentially equal to or superior to present commercial panel glasses with respect to the several other properties required in panel glasses for color television tubes. For example, they must meet standards of chemical durability, X-ray absorption, electrical resistivity, good meltability, and resistance to discoloration under electron bombardment.

To these various ends, the invention contemplates glasses whose compositions in weight percent, as calculated from the glass batch on an oxide basis, consist essentially of, in addition to silica, 1-3% $Al_2O_3$, 1.5-3% MgO, 2.5-4.5% CaO, 5-10% SrO, 3-10% BaO, 1-2.5% PbO, 6-10% $Na_2O$, 4-8% $K_2O$, and the total content of SrO+BaO+CaO+MgO being 15-24%. Optimum conditions prevail when the ratio of $Na_2O$ to $K_2O$ is at least 1:1, and when the ratio of BaO to SrO is also at least 1:1. The glass may be softened by addition of up to 0.4% fluorine, and additive ingredients include up to 1% each of $TiO_2$, $CeO_2$, $Sb_2O_3$, $As_2O_3$ and oxide glass colorants. Otherwise, it is generally desirable to avoid the presence of other oxides except on a trace or impurity basis.

The principal functions of the various glass constituents, and the basis for their limits as set forth above, follow:

Within the present composition field, compaction is controlled largely by adjustment of glass viscosity. Thus, compaction is lowered between 1.5 and 2.5 parts per million per °C. increase in glass strain point. Also, there is a greater tendency toward compaction in a glass having a steeper viscosity curve, that is, a glass in which viscosity values tend to increase more rapidly at higher temperatures in the melting area than at lower temperatures in the vicinity of the strain point and below. Hence, for compaction purposes, those oxides that tend to increase the strain point while providing a flat viscosity curve are preferred.

A small amount of alumina ($Al_2O_3$) is included to provide chemical durability. The glass strain point increases rapidly with increase in $Al_2O_3$ content, and the viscosity curve tends to flatten also, thus making this a desirable additive from the standpoint of compaction. However, the liquidus temperature tends to increase and melting becomes more difficult with increased $Al_2O_3$. Hence, the content of this oxide should not exceed 3% and is preferably not over 2%.

Calcium and magnesium oxides (CaO, MgO) are employed to attain both a higher strain point and increased electrical resistivity. However, they do increase liquidus somewhat and their upper limits must be observed for this reason. In general, these oxides are added as the mineral dolomite for cost reasons.

The oxides of strontium, barium and lead (SrO, BaO, PbO) all impart X-ray protection to the glass, that is, enhance the ability of the glass to absorb X-rays generated during tube operation. As is well known, PbO should be used in limited amounts because of an apparent tendency to cause glass discoloration due to electron bombardment. SrO tends to provide greater absorption than BaO, but is more expensive and has an adverse effect on liquidus temperature. Therefore, the SrO content is maintained as low as practical consistent with attaining the required X-ray absorption.

The alkali metal oxides, $Na_2O$ and $K_2O$, are employed to adjust the coefficient of thermal expansion and the softness of the glass. Heretofore, $K_2O$ has frequently been favored for higher electrical resistivity and because of a lesser tendency to soften the glass. However, as indicated earlier, these properties are maintained in the present glasses through use of CaO and MgO, and an excess of $Na_2O$ is generally preferred to decrease the liquidus temperature of the glass.

Absence of fluorine from the glass may be desirable for environment reasons. However, a minor addition may markedly lower the liquidus temperature in some glasses and is contemplated for that purpose. Even then, the amount must be curtailed because of the very substantial effect on viscosity in general, and strain point in particular. While up to 0.4% F may be included in the calculated batch, it is well known that a part of this will normally volatilize during melting, and that the glass, as analyzed will not contain over about 0.3% F.

It is a virtual necessity in color television tubes, where electrical potential is high, to include an additive to inhibit discoloration, and up to 1% cerium oxide ($CeO_2$) is customarily used for that purpose. The oxides of arsenic and antimony are employed for the usual fining purposes; titania may enhance the ceria discoloration inhibiting power and also adjust chromaticity; and the colorant oxides are employed to provide a neutral color that enhances image contrast in the tube. While all but the $TiO_2$ will invariably be present in a panel glass for a color television tube, these additives are not considered essential since they do not significantly affect the basic features of the present invention.

The oxides of zirconium, zinc and tungsten, heretofore suggested for radiation absorptive purposes, are generally avoided in the present glasses. They tend to add to the cost; their influence on compaction, if any, is adverse; and the benefits they provide are attained otherwise. The oxide of boron, while capable of lowering the liquidus, unduly softens the glass and steepens the viscosity curve; hence is avoided.

SPECIFIC EMBODIMENTS

Reference is again made to the drawing. As mentioned earlier, the curves of the drawing are based on data taken from three actual glasses. The compositions of these glasses represent three similar, but somewhat different, areas in the alkali metal, alkaline earth metal silicate composition fields. The compositions, in parts by weight as calculated on an oxide basis from the glass batch, are set forth in Table I. Also shown are several relevant properties measured on these glasses including softening point (S.P.), strain point (St.P.), coefficient of thermal expansion $\times 10^{-7}$ (Exp.), and liquidus temperature (Liq.). All temperatures are in degrees Centigrade (°C.).

TABLE I

| | A | B | C |
|---|---|---|---|
| $SiO_2$ | 63.3 | 59.5 | 55.0 |
| $Al_2O_3$ | 2.0 | 2.0 | 3.0 |
| $B_2O_3$ | — | — | 0.9 |
| $ZrO_2$ | — | — | 2.6 |
| MgO | 0.8 | 2.6 | 1.6 |
| CaO | 1.7 | 3.9 | 2.3 |
| ZnO | — | — | 3.5 |
| SrO | 10.2 | 7.7 | 5.3 |
| Bao | 2.4 | 7.7 | 6.5 |
| PbO | 2.3 | 2.4 | 0.9 |
| $Na_2O$ | 7.1 | 8.6 | 7.1 |
| $K_2O$ | 8.7 | 5.6 | 10.1 |
| $TiO_2$ | 0.5 | 0.5 | 0.5 |
| $CeO_2$ | 0.15 | 0.15 | 0.15 |
| $As_2O_3$ | 0.2 | 0.2 | 0.2 |
| $Sb_2O_3$ | 0.4 | 0.4 | 0.4 |
| F | 0.3 | 0.35 | — |
| S.P. | 688 | 690 | 708 |
| St.P. | 462 | 471 | 487 |
| Exp. | 99 | 97 | 99 |
| Liq. | 850 | 830 | <685 |

Glass A is a typical prior panel glass (strain point of 462°) relying on high SrO for radiation absorption and dominant $K_2O$ for electrical resistivity. This glass had compaction values that were regarded as unduly high when subjected to subsequent thermal treatments in the 400°–450° C. range. Glass B represents a glass within the present invention wherein the compaction values are substantially reduced. Glass C is a composition differing essentially in the presence of ZnO, $ZrO_2$, and $B_2O_3$, and having $K_2O$ as the dominant alkali metal oxide. Glass C, having the highest strain point, might be expected to have the best compaction values of the three glasses. However, this did not prove to be the case as shown by compaction data measured on the glasses during 60 minute thermal treatments at 415° C. and 450° C. after a standard commercial annealing. The data shows relative movement of the glass in parts per million (ppm) and indicates the superiority of glass B insofar as compaction is concerned.

TABLE II

| | 415° C. | 450° C. |
|---|---|---|
| A | 73 | 173 |
| B | 54 | 112 |
| C | 59 | 140 |

The invention is further illustrated in Table III wherein are shown compositions of several glasses within the scope of the invention together with selected properties measured on such glasses. The properties are identified as in Table I, except that electrical resistivity is shown as the logarithm, base 10, of the value measured at 350° C. (Log. R-350° C.).

TABLE III

| | 1 | 2 | 3 | 4 | 5 | 6 |
|---|---|---|---|---|---|---|
| $SiO_2$ | 59.5 | 60.2 | 59.2 | 61.3 | 60.3 | 59.3 |
| $Al_2O_3$ | 2.0 | 1.3 | 2.0 | 2.0 | 2.0 | 2.0 |
| MgO | 2.6 | 2.6 | 2.6 | 1.9 | 1.9 | 2.3 |
| CaO | 3.9 | 3.9 | 3.9 | 2.8 | 2.8 | 3.8 |
| SrO | 7.7 | 7.7 | 7.2 | 7.7 | 8.7 | 7.7 |
| BaO | 7.7 | 7.7 | 8.4 | 7.7 | 7.7 | 7.7 |
| PbO | 2.4 | 2.4 | 2.4 | 2.4 | 2.4 | 2.4 |
| $Na_2O$ | 8.6 | 8.6 | 8.6 | 8.6 | 8.6 | 7.9 |
| $K_2O$ | 5.6 | 5.6 | 5.6 | 5.6 | 5.6 | 6.6 |
| $TiO_2$ | 0.5 | 0.5 | 0.5 | 0.5 | 0.5 | 0.5 |
| $CeO_2$ | 0.16 | 0.16 | 0.16 | 0.16 | 0.16 | 0.16 |
| $As_2O_3$ | 0.2 | 0.2 | 0.2 | 0.2 | 0.2 | 0.2 |
| $Sb_2O_3$ | 0.4 | 0.4 | 0.4 | 0.4 | 0.4 | 0.4 |
| F | — | — | — | — | — | 0.3 |
| S.P. | 696 | 693 | 695 | 691 | 695 | 691 |
| St.P. | 479 | 478 | 480 | 472 | 474 | 472 |
| Exp. | 98.4 | 98.7 | 98.1 | 96.1 | 98.5 | 97.4 |
| Liq. | 884 | 799 | 867 | 805 | 843 | 871 |
| Log.R (350° C.) | 7.425 | 7.430 | 7.435 | 7.245 | 7.315 | 7.650 |

Compositions within the present invention may be melted and worked in accordance with standard practice for panel glass. For example, glasses having the compositions of Table III were melted experimentally by mixing batches from commercial ingredients including sand, feldspar, lime, fluorspar (if fluorine is required), strontium, barium and sodium carbonates, litharge, potassium carbonate and/or nitrate, cerium concentrate, arsenic oxide and sodium antimonate. The properly proportioned batch was mixed intimately and placed in a crucible which was electrically heated at 1550° C. and held for four hours to thoroughly melt. Each melt was then poured into slab molds, drawn as cane, or otherwise worked in suitable manner for test purposes. Where compaction measurements were made, the glass sample was given an annealing treatment equivalent to a commercial anneal.

By way of illustrating criticality of certain limits imposed on glasses of the invention, reference is made to Table IV which consists of compositions for a series of glasses within the family of the present glasses, but slightly outside the selected limits in one or more respects. The compositions, as well as glass properties, are shown as in Tables I and III.

TABLE IV

| | 7 | 8 | 9 | 10 |
|---|---|---|---|---|
| $SiO_2$ | 59.6 | 58.5 | 55.5 | 61.5 |
| $Al_2O_3$ | 2.0 | 2.0 | 2.0 | 2.0 |
| MgO | 2.3 | 2.6 | 4.4 | 2.4 |
| CaO | 3.8 | 3.9 | 8.4 | 4.4 |
| SrO | 7.7 | 8.7 | 2.3 | 2.6 |
| BaO | 7.7 | 7.7 | 2.6 | 2.6 |
| PbO | 2.4 | 2.4 | 6.8 | 6.8 |
| $Na_2O$ | 9.7 | 8.6 | 8.0 | 8.0 |
| $K_2O$ | 4.5 | 5.6 | 8.1 | 8.1 |
| $TiO_2$ | 0.5 | 0.5 | 0.5 | 0.5 |
| $CeO_2$ | 0.16 | 0.16 | 0.16 | 0.16 |
| $As_2O_3$ | 0.2 | 0.2 | 0.2 | 0.2 |
| $Sb_2O_3$ | 0.4 | 0.4 | 0.4 | 0.4 |
| F | 0.35 | — | 0.25 | 0.25 |
| S.P. | 680 | 691 | 678 | 675 |
| St.P. | 464 | 478 | 467 | 452 |
| Log R (350) | 7.055 | 7.480 | 7.720 | 7.245 |
| Liq. | 807 | 947 | 1101 | 728 |

Example 7 is a glass wherein the combination of high fluorine and soda contents has imparted a low strain point and pushed the log R value at 350° C. down to a marginal value. Omission of the fluorine and/or adjustment of other ingredients such as $Na_2O$ and $K_2O$ will correct these faults and provide a satisfactory glass.

Example 8 illustrates the tendency of SrO to impart too high a liquidus value when its content exceeds that of BaO in the present glasses. The same problem, only considerably aggravated, is illustrated in Example 9 wherein both MgO and CaO contents substantially exceed the permitted limits.

Finally, both Examples 9 and 10 illustrate the adverse effect on strain point and on steepness of the viscosity curve when PbO is substituted for SrO and BaO in too great amounts.

We claim:

1. In a cathode ray tube for reception and display of color television comprising a display panel portion, a neck portion having an electron gun mounted therein, an intermediate funnel portion, and an electron mask having a pattern of perforations aligned with a pattern of phosphor configurations forming a screen on the panel, said panel consisting of a silicate glass having a low compaction when heated to temperatures between 400°-500° C., a strain point over 470° C., a liquidus below 900° C., and a composition, as calculated in weight percent from the batch on the oxide basis, chemically composed essentially of, in addition to silica, 1-3% $Al_2O_3$, 1.5-3% MgO, 2.5-4.5% CaO, 5-10% SrO, 3-10% BaO, 1-2.5% PbO, 6-10% $Na_2O$, 4-8% $K_2O$, the ratio of $Na_2O$:$K_2O$ being at least 1:1, and the total content of SrO+BaO+CaO+MgO being 15-24%.

2. In a cathode ray tube in accordance with claim 1, the ratio of BaO:SrO being at least 1:1 in the composition of the glass panel.

3. In a cathode ray tube in accordance with claim 1, the composition of the glass panel containing up to 0.4% F.

* * * * *